Figure 1:
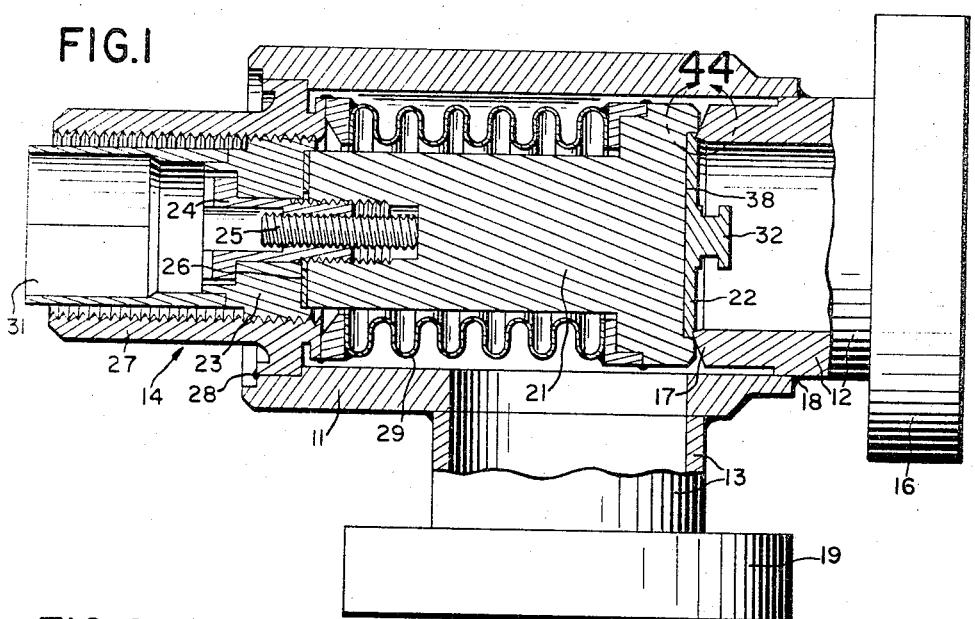

April 23, 1968   W. R. WHEELER   3,379,210
HIGH VACUUM VALVE
Filed Aug. 6, 1962

INVENTOR.
WILLIAM R. WHEELER
BY
ATTORNEY 3,379,210
HIGH VACUUM VALVE
William R. Wheeler, Saratoga, Calif., assignor to Varian Associates, Palo Alto, Calif., a corporation of California
Filed Aug. 6, 1962, Ser. No. 214,988
12 Claims. (Cl. 137—327)

This invention relates to a valve and more particularly to a high vacuum valve bakeable at high temperatures in either the open or closed position.

Good ultrahigh vacuum technique normally entails high temperature (for example, 300° C.) bakeout of the vacuum system components in order to produce outgassing thereof. Such procedures condition the vacuum systems internal walls so as to greatly reduce the system pressure attainable in addition to reducing the time required to achieve lower pressures.

Prior vacuum valves have been generally unsuited for ultrahigh vacuum applications because of the above-mentioned baking requirements. The valves normally include parts which can not withstand high temperatures without deterioration and, therefore, cannot be baked.

Some of these prior valves are designed to allow dismantling for removal of critical parts after which the remaining parts can be baked. Even these valves are not satisfactory, however, since dismantling is a costly procedure. Also, of even greater significance, the requirement that certain parts be removed before baking renders the valves incapable of bakeout in the closed position which greatly hinders their usefulness.

It is, therefore, the object of this invention to provide a high vacuum valve which is bakeable at high temperatures in either the open or closed position.

One feature of this invention is the use of only all-metal bakeable parts for a vacuum valve including the gasket thereby providing a valve which is bakeable and rugged.

Another feature of this invention is the provision of a means for readily replacing the rigid metal gasket within the valve whereby the valve can be provided with a new gasket without dismantling.

Another feature of this invention is the provision of two conduits leading to the valve seat with the diameter of one conduit being larger than the other whereby the rigid metal sealing gasket of the valve can be removed from the valve through the larger conduit and replaced by another sealing gasket without distortion thereof.

Another feature of this invention is the provision of a seal geometry that maintains a high vacuum seal at high temperatures and which allows a plurality of valving operations before replacement of the valve's metal gasket becomes necessary.

Another feature of this invention is the provision of a novel seal geometry which forcibly retains the sealing gasket within the sealing area after a first seal is made.

Another feature of the present invention is the provision in a vacuum valve seal geometry which is particularly suited for controlled leak operations.

Another feature of this invention is the provision of a unique valve gasket and a simplified tool for removing the gasket from the valve.

Figure 2:
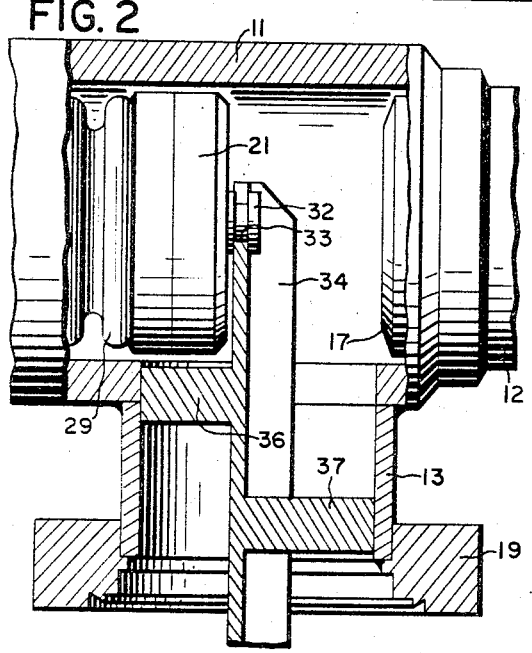
Figure 3:
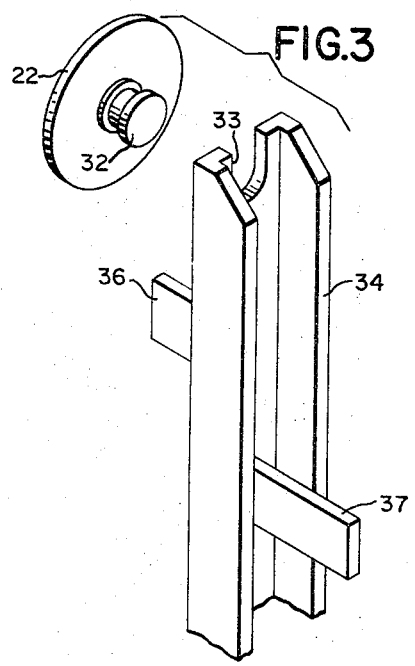
Figure 4:
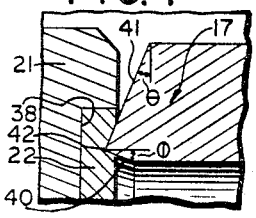
Figure 5:
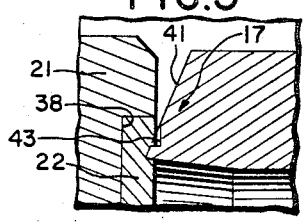

These and other features and advantages of the present invention will be more apparent after a perusal of the following specification taken in connection with the accompanying drawings wherein, FIG. 1 is a cross-sectional view of the valve, FIG. 2 is an enlarged cross-sectional view of the valve seat for the valve shown in FIG. 1 incorporating the tool to remove the gasket, FIG. 3 is a pictorial view of the gasket and the gasket removal tool, FIG. 4 is an enlarged section of the valve seat enclosed by circle 4—4 of FIG. 1, and FIG. 5 is an alternate embodiment of the valve seat of FIG. 4.

Referring to FIG. 1, the valve has preferably a cylindrical body 11 with an inlet 12 axially aligned therewith and an outlet 13 disposed normal thereto and has a valve stem assembly 14 disposed within the body 11. The inlet 12 is preferably a short cylindrical conduit with a flange 16 on its external end and has a valve seat 17 (to be explained hereinafter) machined on its internal end. The inlet 12 projects into and is welded to body 11 by a gas-tight weld-fillet 18. Inlet 12 can also be made integral with the body 11 and the seat 17 machined thereon with a suitable boring bar, but this process is more costly to fabricate than the embodiment shown. Outlet 13 is also preferably a short cylindrical conduit having one end fixed as by welding to the body 11 and having a flange 19 on its other end.

The valve stem assembly 14 includes a plunger 21 having a recessed cavity 38 at one end in which is disposed a removable gasket or washer 22 made of a soft, ductile metal, for example, copper. An externally threaded sleeve 23 is attached to an internal flange on the other end of the plunger 21 by a bolt 24. Thus the bolt 24, the plunger 21 and the sleeve 23 form a simple swivel joint allowing the sleeve 23 to rotate with respect to the plunger 21. A suitable bearing material 26 is placed between the sleeve 23 and the plunger 21. A clamping screw 25 passes through the internally threaded bolt 24 and is used to exert tightening force between the bolt 24 and the plunger 21 after a seal has been made by the valve seat 17 and the gasket 22 as hereinafter described. Without this anti-backlash feature the bolt 24 will occasionally loosen in the plunger 21 while a seal is being maintained at valve seat 17. Such an occurrence may at times prevent an outward movement of the sleeve 23 from exerting an opening pressure against the loosened bolt 24. Also, since the bolt 24 is concealed within the sleeve 23, such a condition may be unnoticed by an operator of the valve.

The sleeve 23 threads into an internally threaded nut member 27 that is preferably extended into and is welded to body 11 by a gas-tight weld-fillet 28. Between the nut member 27 and the plunger 21 is welded a metal bellows 29 to provide a gas-tight flexible joint between the two members. The outer end of sleeve 23 has an indented socket 31 in the form of a regular polygon, for example, a square or hexagon, so that a suitable socket tool, such as an Allen wrench, could be used to actuate the valve.

The valve operates as follows: A socket tool is inserted in the socket 31 to turn the sleeve 23. Plunger 21 advances toward the seat 17 causing the gasket 22 to bear against it. To obtain a gas-tight seal a large bearing pressure sufficient to deform the gasket is applied between the two. The use of metal bellows 29 makes the cylindrical valve body 11 vacuum tight and thus allows a high vacuum to be maintained at both the inlet and outlet with the valve either open or closed.

After the valve has been opened and closed a number of times under high vacuum conditions, the gasket 22 may become contaminated or deformed by extraneous material accidently lodging in the seal area. Subsequent seals will then require a greater sealing force in order to overcome the sealing problems created by such contamination. This is a cumulative problem as the exertion of greater force will cause a deeper penetration by the valve seat 17 thereby increasing the area of sealing surface. The larger seal area then requires a larger total sealing force to provide a good seal and eventually the sealing force required becomes prohibitive. At this time the gasket 22 should be replaced by a new uncontaminated gasket. However, the gasket 22 cannot be easily removed because the repeated high pressure closures of the seal have an effect of tightly wedging the gasket into the gasket recess cavity 38.

The above problem is alleviated in the present invention by providing for simple replacement of the gaskets with a gasket removal tool 34 as shown in FIGS. 2 and 3. The gasket 22 has a centrally located circumferentially grooved knob 32 that is shaped to allow engagement by the slot 33 formed on the end of the gasket removal tool 34. The tool 34 has two fulcrum points 36 and 37 that engage the outlet 13 preferably as shown whereby as the valve stem 14 is backed away from the seat 17 with bar 34 engaging the gasket knob 32, the gasket will pop out of the cavity recess 38.

After the gasket 22 has been loosened it can be removed from the interior of the valve through the cylindrical outlet 13 which is made to have a diameter larger than the circular gasket 22. A new gasket 22 can then be inserted through the outlet and placed in the cavity recess 38. Since the new gasket before subjection to a sealing operation is not deformed or stretched it readily fits into the recess and the valve is ready for use. After a first seal is made the wedging force created within the cavity 38 forcibly retains the gasket thereby preventing possible damage which could be caused by a dislodged gasket.

In order to provide for removal of the gasket 22, the outlet 13 has a larger diameter than the inlet 12 which is of smaller diameter than the circular gasket 22. It would also be possible to make inlet 12, seat 17 and gasket 22 of elliptical shape in which case the inlet 12 and outlet 13 could be the same size and still allow removal of the gaskets 22 through either the inlet or outlet. However, the use of elliptical components would greatly increase the cost and complexity of the valve and would therefore be less desirable than the embodiment shown.

Referring to FIG. 4 the seat 17 has a conical annular surface 41 that is inclined to the gasket 22 through a small angle $\theta$ of about 10°–35° whereby on closing the valve an edge 42 first makes contact with the gasket. The gasket is compressed and prevented from flowing by the recess cavity 38 so that a large bearing pressure is produced at the interface. This sealing feature maintains a good vacuum seal even under high temperature conditions and is taught in U.S. patent application Ser. No. 144,458, filed Oct. 11, 1961, now Patent 3,208,758, and assigned to the same assignee as this application. However, in addition to the sealing principles taught in the above patent application, the present invention provides a sealing face geometry which is uniquely suited for high vacuum valves. As shown in FIG. 4, opposite the sealing surface 41 is an auxiliary sealing surface 40 which makes an angle $\phi$ with a line normal to the sealing gasket 22. By utilizing an angle for $\phi$ of about 5–20° the valve is greatly improved for use as a leak valve. The slightly inclined auxiliary sealing surface 40 does not greatly increase the sealing force necessary to close the valve but does allow for a more controlled opening thereof. For a given amount of linear movement by the valve seat 17 the normal sealing surface 41 will move further from its adjacent gasket surface than will the auxiliary surface 40. Thus the auxiliary sealing surface 40 provides for a reduced rate of seal opening per linear movement of the plunger 21 allowing more control over leak rates.

Referring to FIG. 5, the seat 17 is modified wherein the inclined surface 41 has a circumferential groove 43. The circumferential groove 43 limits the total inclined area on surface 41 that will bear into the gasket. Since, as described above, the sealing force required for a good seal is dependent upon the size of the sealing surface area, this feature substantially reduces the maximum force needed to close the valve. This valve seat geometry is particularly suited to large valves requiring relatively large sealing forces.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A valve comprising a cylindrical tubular valve body, a cylindrical inlet conduit having a valve seat formed at one end protruding from one end of said body and welded in gas-tight relation thereto with said seat disposed within said body, a cylindrical outlet conduit protruding from the side of said body, and a valve stem assembly disposed to move axially within said body, said valve stem assembly comprising an internally threaded nut welded gas-tight to the other end of said body, an externally threaded sleeve threaded into said nut, a plunger rotatably attached to said sleeve by an internally and externally threaded swivel bolt means comprising a clamping bolt threaded through said swivel bolt to prevent backlash, said plunger having a recess facing said valve seat, a rigid-flat-metal gasket disposed within said recess, and a metal bellows welded gas-tight at one end to said nut member and at the other end to said plunger, said valve seat having a conical annular surface making an angle with said gasket, said angle having a value between 10° and 35°.

2. The valve according to claim 1 wherein said valve seat has an annular auxiliary sealing surface opposite said conical annular surface, and said annular auxiliary sealing surface makes an angle with said gasket of between 70–85° thereby providing a valve seal which allows sensitive regulation of leak rates.

3. The valve of claim 1 wherein said conical annular surface has an annular recess formed therein whereby the bearing area between said gasket and seat is limited and the bearing pressure therebetween is proportional to the force placed on the gasket.

4. An all metal high vacuum valve bakable in the open or closed position comprising a cylindrical tubular body having inlet and outlet openings, a valve seat disposed within and towards one end of said body, said valve seat having a conical annular surface making a first angle with said gasket and an annular auxiliary sealing surface opposite said conical annular surface making a second angle with said gasket, said first angle having a value between 10° and 35°, said second angle having a value between 70° and 85°, a movable valve stem assembly disposed within and towards the other end of said body, said assembly having a recessed cavity facing said valve seat, and a gasket disposed within said recess, said gasket having a flat portion adapted to be engaged by said valve seat and a knob portion protruding from said flat portion adapted to be engaged by a tool thereby providing for removal of said gasket from said valve.

5. A valve comprising a tubular valve body having a valve seat at one end, a valve stem assembly including an internally threaded nut fixed at the other end of said body, an externally threaded sleeve threaded into said nut, a plunger rotatably attached to said sleeve by an internally and externally threaded swivel bolt, said plunger having an end facing said valve seat, means comprising a clamping bolt threaded through said swivel bolt to prevent backlash, and a rigid metal gasket fixed at the end of said plunger facing said valve seat.

6. The valve according to claim 5 wherein said end of said plunger facing said valve seat defines a recess for wedgingly receiving and holding said gasket.

7. The valve according to claim 6 wherein said valve seat has a conical annular surface making a first angle with said gasket and an annular auxiliary sealing surface opposite said conical annular surface making a second angle with said gasket, said first angle having a value between 10° and 35°, said second angle having a value between 70° and 85°.

8. The valve according to claim 7 wherein said conical annular surface has a circumferential groove formed therein whereby the bearing area between said gasket and seat is limited and the bearing pressure therebetween is proportioned to the force placed on the gasket.

9. The valve according to claim 5 further including means for removing said gasket from said assembled valve.

10. A valve comprising a tubular valve body having a valve seat at one end, a valve stem assembly threaded into the other end of said body, said valve stem assembly having an end facing said valve seat and defining a recess, and a rigid metal gasket disposed in said recess of said stem assembly, said valve seat having a conical annular surface making a first angle with said gasket and an annular auxiliary sealing surface opposite said conical annular surface making a second angle with said gasket, said first angle having a value between 10° and 35°, and said second angle having a value between 70° and 85° thereby providing a valve seal which allows sensitive regulation of leak rates.

11. The valve of claim 10 wherein the portion of said conical annular surface which makes sealing engagement with said gasket has a circumferential groove formed therein whereby the bearing area between said gasket and seat is limited.

12. A valve comprising a tubular valve body having a valve seat at one end, a valve stem assembly threaded into the other end of said body, said valve stem having a recess in the end thereof facing said valve seat, a rigid metal gasket disposed on said stem assembly within said recess and including knob means having a peripheral groove therein adapted to be engaged by a tool for removing said gasket from said stem assembly while said stem assembly is within said body, said knob means being disposed on the side of said gasket which faces said valve seat and being arranged to project away from said stem assembly, said valve seat having a conical annular surface making an angle with said gasket and oriented to wedge said gasket radially into contact with the walls of said recess, said valve seat having an inside diameter larger than the maximum outside diameter of said knob means, and said valve having a port in the side thereof of sufficient diameter for passage of said gasket therethrough.

References Cited

UNITED STATES PATENTS

| | | | |
|---|---|---|---|
| 305,740 | 9/1884 | Clapp | 251—333 |
| 587,855 | 8/1897 | Park et al. | 251—357 X |
| 668,012 | 2/1901 | Locke | 251—333 |
| 1,119,948 | 12/1914 | Green | 137—315 |
| 1,775,090 | 9/1930 | Frank | 251—357 |
| 2,105,864 | 1/1938 | Saunders | 251—335.2 |
| 2,126,897 | 8/1938 | Lamar | 137—315 X |
| 2,840,337 | 6/1958 | Sasserson et al. | 251—367 X |
| 1,719,316 | 7/1929 | Appleton | 137—327 |
| 2,366,520 | 1/1945 | Griffith | 137—327 |
| 1,270,970 | 7/1918 | Rich | 254—131 |
| 2,135,065 | 11/1938 | Wick | 254—131 |
| 2,298,338 | 10/1942 | Berkery | 251—357 |
| 2,569,471 | 10/1951 | Harding | 251—357 |

FOREIGN PATENTS 1,132,563  11/1956  France.
   12,334   6/1894  Great Britain.

WILLIAM F. O'DEA, *Primary Examiner.*

R. GERARD, *Assistant Examiner.*